United States Patent
McKellar

(10) Patent No.: US 8,564,606 B2
(45) Date of Patent: Oct. 22, 2013

(54) TEXTURING 3-DIMENSIONAL COMPUTER GRAPHIC IMAGES

(75) Inventor: Colin McKellar, Helmel Hempstead (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 1274 days.

(21) Appl. No.: 10/564,306

(22) PCT Filed: Jun. 16, 2004

(86) PCT No.: PCT/GB2004/002593
§ 371 (c)(1), (2), (4) Date: May 15, 2006

(87) PCT Pub. No.: WO2004/114222
PCT Pub. Date: Dec. 29, 2004

(65) Prior Publication Data
US 2007/0052718 A1 Mar. 8, 2007

(30) Foreign Application Priority Data
Jun. 17, 2003 (GB) .................................. 0314031.6

(51) Int. Cl.
*G06T 11/40* (2006.01)
*G09G 5/00* (2006.01)

(52) U.S. Cl.
USPC ............................. 345/582; 345/552; 345/587

(58) Field of Classification Search
USPC ................... 345/428, 552, 582, 587
See application file for complete search history.

(56) References Cited

U.S. PATENT DOCUMENTS

| 5,548,709 A | 8/1996 | Hannah et al. |
| 6,493,858 B2 * | 12/2002 | Solomon .......................... 716/11 |
| 6,747,649 B1 * | 6/2004 | Sanz-Pastor et al. .......... 345/428 |
| 6,924,814 B1 * | 8/2005 | Ephanov ........................ 345/582 |

FOREIGN PATENT DOCUMENTS

| EP | 1 267 308 A2 | 12/2002 |
| EP | 1 267 308 A3 | 4/2004 |

OTHER PUBLICATIONS

Search Report dated Oct. 24, 2003 in UK Appln. No. GB 0314031.6 (2 pages).
International Search Report dated Oct. 19, 2004 in PCT International Appln. No. PCT/GB2004/002593 (6 pages).
"5.2 Mipmap Generation", 1996 (2 pages), downloaded from: http://www.sgi.com/software/opengl/advanced98/notes/node35.html.
Moeller, T., et al., *Real-Time Rendering*, (Chapter 5, "Texturing"), 1999, A.K. Peters, Ltd., Natick, Massachusetts, pp. 99-144.
PowerVR, "PowerVR—White Paper 1.0.5", Nov. 14, 2000, PowerVR 2000, (8 pages).

* cited by examiner

*Primary Examiner* — Hau Nguyen
(74) *Attorney, Agent, or Firm* — Michael S. Garrabrants; Artesynip, Inc.

(57) ABSTRACT

A method and apparatus are provided to generate automatically a mip-map chain of texture images from a portion of texture image data such that it may be used in texturing a computer graphic image. A portion of the texture image data is stored temporarily and is filtered to generate at least one lower level of mip-map data from the texture data. This lower level of mip-map texture image data is then stored for use in texturing. Preferably these are stored on a tile-by-tile basis where a tile is a rectangular area of the image being displayed.

21 Claims, 4 Drawing Sheets

128x128

64x64

32x32 etc.

TEXTURING 3-DIMENSIONAL COMPUTER GRAPHIC IMAGES

FIELD OF THE INVENTION

This invention relates to the texturing of 3-dimensional computer graphic images and in particular to a technique in which a mipmap chain of texture images is automatically generated during the process of texturing an image.

BACKGROUND OF THE INVENTION

Texture mapping is a well-known technique in computer graphics and is used to apply bitmaps of texture image to objects being shaded to increase the realism of their representation. The texture images are bitmaps which are stored in memory.

During rendering of an image, if textures are sampled only one per screen pixel, aliasing will become a significant problem. FIG. 1 shows a texture receding into the distance with a single texture sample per pixel. As can be seen, the smaller samples start to show visible aliasing artefacts.

Mipmapping is a known technique which is used to reduce the aliasing artefacts in texture mapping. Essentially, mipmapping involves storing filtered versions of the source data being represented, at different view points. These view points typically represent different distances to the object. Thus, a typical mipmap would consist of the original texture plus further copies at ½, ¼, ⅛, etc. resolutions. To produce these lower resolutions, each pixel is a filtered average value of e.g. four pixels from the next highest resolution mipmap. Pre and post filtering of the texture can further improve the quality of the rendered image by further reducing aliasing and ringing artefacts.

When mipmaps and texture maps are stored in memory, it is known to use a method called twiddling to ensure that spatially related data is stored together. This can greatly improve memory bandwidth utilisation by reducing the number of page breaks within a read of a portion of e.g. texture data. Further memory bandwidth requirements can be obtained by using systems known as tile based rendering systems. This is a technique in which an image to be rendered is broken down into a set of smaller rectangular areas or tiles. Each tile is processed individually for the objects which may be visible within it thereby reducing memory bandwidth requirements and therefore the size of any internal storage buffers. Lighting and reflections may be applied to rendered 3D objects by using a technique known as cubic environment mapping. This operates by, for example, first rendering a scene as it would be seen if looking outwards from the face of an object into an environment map texture. This texture is then mapped onto the face of the object.

Cubic environment maps which are sometimes referred to as cubic maps, are textures that contain image data representing scenes surrounding an object, as if the object were in the centre of cube. Each face of the cubic environment map covers a 90° field of view in the horizontal and vertical and there are six faces per cube map. Each face is perpendicular to the X/Y, Y/Z, or X/Z plane in 3D space. These maps are implemented as a series of texture objects. Applications can use static images for cubic environment mapping or they can render into the faces of the cube map to perform dynamic environment mapping.

SUMMARY OF THE INVENTION

Preferred embodiments of the present invention provide a technique in which a mipmap chain is automatically created from a texture map. In known immediate mode rendering devices (IMR) this effect would typically be achieved by first reading a top level mipmap and then producing a scaled down version of the mipmap level and repeating this process until all map levels have been generated. This is typically accomplished either using existing 3D graphics hardware pipeline or using a piece of dedicated scaling hardware. This has the disadvantage of consuming rasterisation time if the 3D hardware is used or additional read and write bandwidth from external memory if additional hardware is used.

The ability to create automatically mipmap data is particularly useful when dynamically created textures such as dynamic environment maps are being used. These by their very nature do not have a pre-generated mipmap chain available. Using known systems, this is not possible unless rasterisation time is increased in the 3D hardware or additional read and write bandwidth from external memory is required if additional hardware is used.

We have appreciated that by utilising the internal storage of a tile-based 3D graphics engine, a number of mipmap levels can be generated for e.g. a dynamic environment texture map with no additional hardware passes. Any further mipmap levels that are subsequently required can then be generated at a fraction of the bandwidth cost associated with an IMR system.

Preferably, in a tile-based 3D graphics engine, a memory buffer known as the tile buffer is used for temporary storage of mipmap levels as they are generated. In normal usage the tile buffer is used to store a rectangular portion of the image being rendered.

Preferred embodiments of the invention can also be used to generate mipmaps for data supplied from other sources such as video streams and user supplied bitmaps. In the latter case, mipmap generation can be performed during the process of copying data from a direct memory access (DMA) buffer to a frame store, thereby saving an additional copy of the data from host to frame buffer memory.

Embodiments of the invention also seek to improve the visual quality of the supplied data stream by allowing filtering to be performed pre and post mipmap generation.

The invention is defined in its various aspects in the appended claims to which reference should now be made.

BRIEF DESCRIPTION OF THE DRAWINGS

A preferred embodiment of the invention will now be described in detail by way of example with reference to the accompanying drawings in which.

DETAILED DESCRIPTION OF PREFERRED EMBODIMENT

The embodiment now described enables mipmap chains to be generated dynamically, substantially in real time, with less intervention by any driver or application software than has previously been the case. This is achieved by using dedicated hardware for the dynamic mipmap generation, which is faster than traditional methods for performing this task in software and also minimises additional bandwidth requirements or hardware contention issues exhibited by existing hardware.

Figure 1:
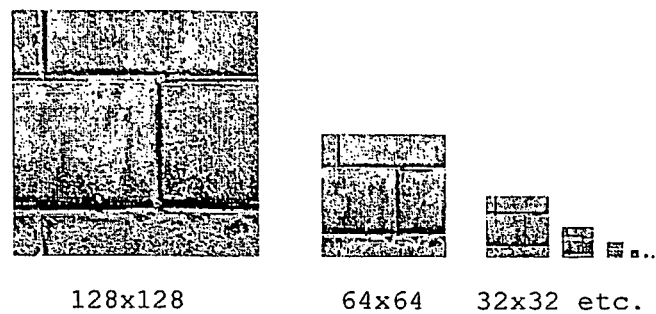
FIG. 1 shows a sample of texture data receding into the distance as discussed above.
Figure 2:
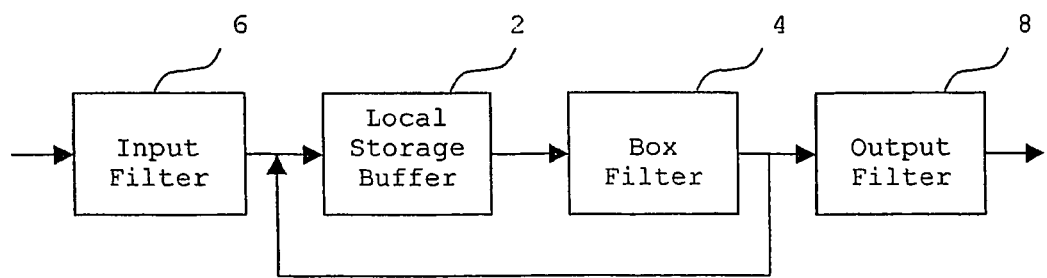
FIG. 2 shows a block diagram of the hardware required to implement the present invention.

FIG. 2 shows schematically the hardware required to dynamically generate mipmap chains. Primarily, this comprises a local storage buffer 2 and a box filter 4 to create a filtered output of input data for the generation of lower level mipmaps.

The input data stream is stored in the local storage buffer 2 and a copy is written to the main texture memory (not shown). The data from the local storage buffer is then filtered to half is original dimensions in the X and Y directions, and thus to half its resolution and via a feedback loop is stored back into the local storage buffer 2 as well as being output to the main external texture memory. This operation is repeated until all the required mipmap levels have been generated and stored into the main texture memory.

A counter is employed on the feedback loop to ensure that the correct number of levels of mipmap data are generated.

The local storage buffer can be large enough to store all the different mipmap levels at different storage locations. Alternatively, it can be small in size and data can be overwritten as each mipmap level is generated.

Its minimum size will be the size of the highest level mipmap.

For original texture image data which is large at the highest mipmap level, performance can be improved by breaking this down into smaller more manageable chunks of data, in a similar manner to that used in tile base rendering, and by processing each of these tiles individually. This reduces the amount of storage required to perform the operation. For example, a larger rectangular mipmap may initially be broken down into four smaller rectangular chunks and each of these is then processed individually. If this is done, then preferably each of the four chunks is stored in a known location at each mipmap level. When a mipmap is retrieved for texturing purposes all four portions of the required level are retrieved and are recombined to produce the complete mipmap level.

Figure 3:
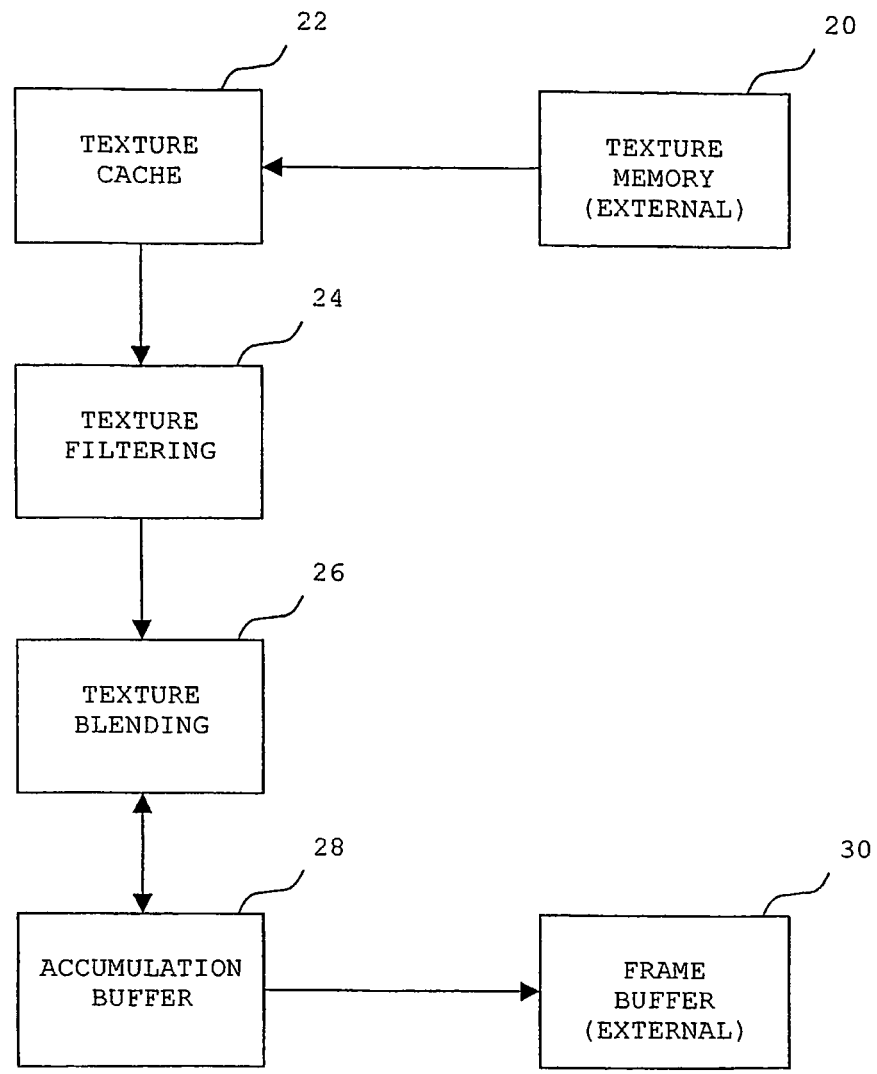
FIG. 3 shows a block diagram of a known texture processing unit.

The arrangement of FIG. 3 also shows an input filter 6 with an output filter 8. These can be selectively activated. The additional pre and post filtering allows a user to improve the quality of the data.

In this particular example a simple box (averaging) filter is used. This could, however, be replaced with a more complicated filter type. The purpose of the pre-post filter in this example is to improve the quality of the mipmap image by anti-aliasing the data. This is particularly useful for video data sources as they are generally supplied without mipmaps and due to the nature of such sources have not been filtered before they are supplied to a graphics application. If they are used in the form in which they are supplied they are susceptible to banding and ringing artefacts.

In one example of dynamic mipmap generation, input texture data is provided as an image which is 1024×1024 pixels in size. This represents the top image in a mipmap chain. This is then broken down into tiles each with the measurements of 32×32 pixels. Each tile is filtered before it is stored into the local buffer to improve the quality of the data. For example, if the input data is a video image it can be low pass filtered to improve the visible aliasing present in the source image.

For each tile in turn, the 32×32 portion of image data (Mipmap A) stored in the location storage buffer 2 is filtered by the box filter into a 16×16 image (Mipmap B) and the results stored back into the relevant storage buffer 2 as well as being written to external memory. This is followed by a further filtering of the 16×16 image into an 8×8 image. The process repeats until the image is reduced to a 1×1 pixel map.

By performing mipmap generation on a tiled image as in this example, the storage capacity for the operation is reduced by a factor of 1024, since only one tile needs to be processed at a time, and thus the minimum size for the local storage buffer is 32×32 pixels.

Twiddled storage of texture reduces memory page breaks by grouping blocks adjacent to texels into physical blocks within the memory. A group of four texels is first organised to make 2×2 blocks. Four of these 2×2 blocks are then organised into a 4×4 block. Four of the 4×4 blocks are then organised into a 16×16 block and so on. This is achieved by bit interleaving the horizontal and vertical coordinates of the memory addresses. This process can be understood straightforwardly in the context of a tile-based rendering 3D graphics engine. In such a system there is already in existence a storage buffer known as a tile buffer. This is used to store a rectangular tile of the rendered image as it is being rendered. Images rendered on a tile-by-tile basis in such systems to reduce the number of objects required to be considered for each pixel.

This tile buffer can be utilised as the local storage buffer 2 of FIG. 2 for the auto-generation of mipmaps. In a first pass the original image (up to one tile in size) is stored in this buffer. The box filter 2 then filters the image to ½ those dimensions and stores the result in the tile buffer. This takes up only ¼ of the buffer as the original data was one tile in size. The new data is then filtered again with the results being stored in the tile buffer now at 1/16 of the size of the original data. The process repeats until the final mipmap level (generally one pixel by one pixel) is generated. After each step, the mipmap level generation is stored temporarily in the tile buffer and then in the main system memory. Each subsequent mipmap level overwrites at least part of the previous level in the tile buffer.

Preferably data is stored in twiddled format. This then requires further filter inputs to be stored consecutively in the buffer, thereby simplifying the operation of reading the data and writing back the result.

In an alternative embodiment, the simple box filter could be replaced with a more complicated filter and a buffer larger than a tile size could be provided. This would allow more complex filtering image/data processing techniques to be performed, automatic edge detection; up-scaling and noise reduction techniques.

FIG. 3 shows the texturing part of a texture signal processing unit of the type which may used in an embodiment of the invention. In this, textures are read from a texture memory 20 into a texture cache 22. Any texture filtering required is then performed in a texture filtering unit 24 before the texture is blended with any existing data for the pixels to which it is being applied, which are stored in the accumulation buffer 28. The blending takes place in a texture blending unit 26. The accumulation buffer stores a rectangular tile of the image which is being textured. The image data associated with the tile have been previous derived before texturing. Once texturing has been performed the image data will be complete and the data can then be written to the frame buffer 30.

The texture memory 20 and the frame buffer memory 30 are typically both part of a main memory of the graphics system. This is large enough to store the frame buffer, and the textures required. In known systems, the textures are stored in mipmap form going from highest to lowest resolution for each texture.

When the system is modified in the embodiment of the present invention the texture memory need only store the highest resolution version of each texture. Then, when the image data for a tile is known, the system can be arranged to generate the lower level resolution mipmaps required to perform full texturing. This is achieved by passing the high resolution mipmap directly to a modified accumulation buffer where the generation of lower level resolution mipmaps will be performed.

Figure 4:
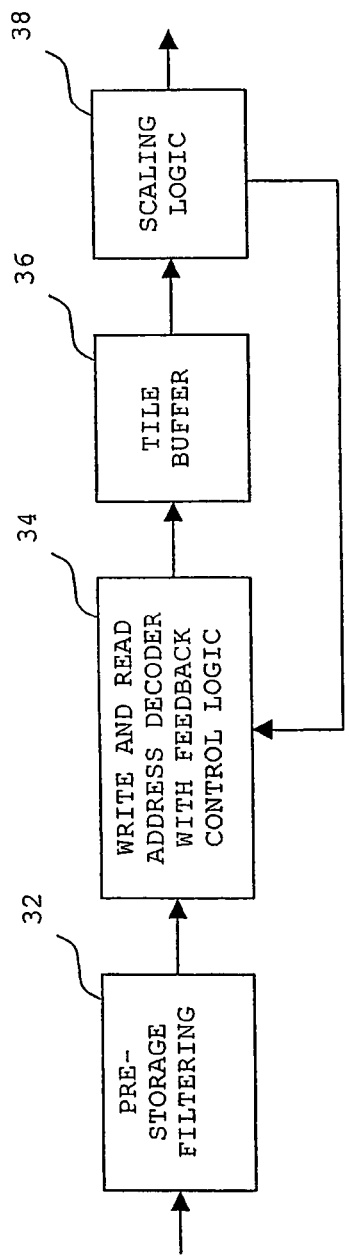
FIG. 4 shows a modification to the accumulation buffer of FIG. 3 embodying the invention.

A modified accumulation buffer 28 is shown in FIG. 4. This comprises a pre-storage filtering unit which is arranged to perform any necessary pre-storage filtering on the high resolution mipmap. The high resolution mipmap is then received by a write and read address decoder unit 34. This decodes the addresses of the high resolution mipmap and supplies them to the tile buffer 36. From here, they can be read via the scaling logic 38 to an output which sends them to the external memory. This is the same output which is usually used to write data into the frame buffer. However, as the frame buffer is a partitioned portion of the main external memory the scaling logic can be modified to send them to a free area of that memory for temporary storage.

At the same time, the scaling logic performs a filtering operation on the texture data. This is then fed back using a feedback control logic portion of the write and read address decoder 34 into the tile buffer 36. This filtering operation generates a lower resolution mipmap typically at half the resolution of the original mipmap. This in turn is then read out via the scaling logic 38 to the external memory whilst at the same time a next lower level mipmap is generated by the scaling logic 38 and fed back to the tile buffer via the read and write address decoder at 34. This process continues until all the required levels of mipmap have been generated.

Alternatively, the scaling logic can be arranged such that on the first iteration it reads out the second lower resolution mipmap on the basis that the higher level resolution mipmap is already stored in texture memory and is thus available to the system. The second level is then stored in the tile buffer 36 and on the next iteration the third level is generated and read out to memory by the scaling logic 38.

Once texture mipmaps have been generated for all the textures required to texture a particular tile, these are then used by the texture signal processing unit of FIG. 3 to texture the surfaces visible in a particular tile using the arrangement of FIG. 3. The operation of this will be known to those skilled in the art.

It will thus be appreciated that it is not necessary to store permanently all the texture data to be applied in mipmap form. Instead, it is necessary only to store the highest resolution of each texture. Also, using such an arrangement gives the system the versatility to read in additional data to be used for texturing. This means that it is not necessary to have a large library of texture data, instead, each image or sequence of images being rendered can have its own library of texture data read into the system before rendering commences.

In a preferred embodiment, for an image or sequence of images to be rendered, all the texture mipmaps required for that image or sequence of images will be generated and stored in main memory prior to commencement of texturing of the whole image. Alternatively, this can be performed on a tile by tile basis.

I claim:

1. A 3-D graphics rendering system, comprising:
a source of full-resolution texture data;
a tile-based 3-D graphics rendering engine comprising a texturing unit;
a tile buffer configured to store portions of an image, as they are being rendered by the tile-based 3-D graphics engine;
a system memory separate from the tile buffer; and
a texture scaling filter, coupled to the tile buffer and to the main system memory, and configured to first input full-resolution texture data, from the source of full-resolution texture data, for a portion of a texture to be used by the tile-based 3-D graphics rendering engine,
to produce a current reduced-resolution version of the inputted texture data, wherein the resolution of the reduced-resolution version is reduced by a scaling factor from the full-resolution texture data,
to store the current reduced-resolution version in the tile buffer,
to store the current reduced-resolution version in the main system memory, and thereafter
to iteratively produce subsequent reduced-resolution versions of the inputted texture data, by scaling, according to the scaling factor, the then-current stored reduced-resolution version, obtained from the tile buffer, to produce a new current reduced-resolution version, and to store the new current reduced-resolution version in the main memory and in the tile buffer as the current reduced-resolution version of the full-resolution texture data,
wherein the texturing unit of the tile-based 3-D graphics engine is configured to use texture data from the produced reduced-resolution versions for texturing a surface visible in a tile of an image during rendering by the tile-based 3-D graphics rendering engine.

2. The 3-D graphics rendering system of claim 1, wherein the texture scaling filter is configured to overwrite at least a portion of one or more current reduced-resolution versions in the tile buffer with the subsequently produced reduced-resolution version.

3. The 3-D graphics rendering system of claim 1, wherein the texture scaling filter is operable to generate a complete mipmap for a portion of the full-resolution texture data using a single read from system memory used to bring the portion of the full-resolution texture data into the tile buffer.

4. The 3-D graphics rendering system of claim 1, wherein the full resolution texture data is dynamically generated.

5. The 3-D graphics rendering system of claim 1, wherein the texture scaling filter is operable to break down the full-resolution texture data into tiles, and to produce an entire mipmap chain for that tile before beginning a subsequent tile of the full-resolution texture data.

6. The 3-D graphics rendering system of claim 1, wherein the source of full-resolution texture data comprises a texture memory coupled to a texture cache, which is coupled to provide full resolution texture data to the texture scaling filter.

7. The 3-D graphics rendering system of claim 6, wherein the system memory comprises the source of full-resolution texture data and a frame buffer for storing the portions of the image, after each portion is rendered by the tile-based 3-D graphics engine.

8. The 3-D graphics rendering system of claim 1, wherein the tile buffer is sized according to a size of a screen-space tile, on which the tile-based 3-D graphics rendering engine operates.

9. The 3-D graphics rendering system of claim 1, wherein the tile buffer is configured to store data representing the reduced-resolution versions of the texture in a format where adjacent textures are grouped into physical blocks in the memory, and each subsequent reduced-resolution version is stored in consecutive locations in the tile buffer.

10. A method of producing a texture mipmap, comprising:
iteratively inputting, into a filter within a tile-based 3-D graphics engine, tile-sized portions of a full-resolution texture, for which a mipmap is to be created; and
for each inputted tile-sized portion, storing each of the tile-sized portions of the full-resolution image in a tile buffer that is also is used by the tile-based 3-D graphics engine, during image rendering, for storing a tile of an image being rendered, filtering the tile-sized portion of the full-resolution image to produce a current reduced-resolution version, storing the current reduced-resolution version in the tile buffer, storing the current reduced-resolution version in a main memory, separate from the tile buffer, and repeating, until the mipmap is complete for the tile-sized portion being processed, the filtering using the current reduced-resolution version from the tile buffer as input to produce a further reduced-resolution version, and the storing operations with the produced further reduced-resolution version.

11. The method of claim 10, further comprising forming a sequence of tiles of full resolution texture data, the tiles sized according to a screen-space tile size operated on by the tile-based graphics engine, and performing the iterative inputting, into the filter within the tile-based 3-D graphics engine, using the sequence of tiles.

12. The method of claim 10, further comprising storing only a full-resolution texture in a system memory, and generating a mipmap for at least a portion of the full-resolution texture in response to a need to apply the texture to a surface visible in an image being rendered by the tile-based 3-D graphics engine.

13. A 3-D graphics rendering system, comprising:
a source of full-resolution texture data;
a tile-based 3-D graphics rendering engine comprising a texturing unit;
a tile buffer configured to store portions of an image, as they are being rendered by the tile-based 3-D graphics engine, the tile buffer supporting accumulation operations;
a system memory separate from the tile buffer; and
a texture scaling filter, coupled to read from the tile buffer and to write to the tile buffer, the texture scaling filter configured to produce a current reduced-resolution version of a tile of full-resolution texture data,
and then to perform, for a determined number of passes, a method comprising
storing the current reduced-resolution version in the tile buffer,
copying the current reduced-resolution version to the system memory over a memory bus,
inputting the current reduced-resolution version from the tile buffer to the texture scaling filter, without using the memory bus,
filtering the current reduced-resolution version to produce a further current reduced resolution version, and
continuing by performing the storing of the further current reduced resolution version as the current-reduced resolution version in the tile buffer.

14. The 3-D graphics rendering system of claim 13, wherein the texture scaling filter is configured to overwrite at least a portion of each current reduced-resolution version in the tile buffer with the further produced reduced-resolution version.

15. The 3-D graphics rendering system of claim 13, wherein the texture scaling filter is operable to generate a complete mipmap for a bitmap during a direct memory access transaction.

16. The 3-D graphics rendering system of claim 13, wherein the texture scaling filter is operable to break down the full-resolution texture data into tiles, and to produce an entire mipmap chain for that tile by performing the method for the determined number of times, before beginning a subsequent tile of the full-resolution texture data.

17. The 3-D graphics rendering system of claim 13, wherein the source of full-resolution texture data comprises a texture memory coupled to store full resolution data in a texture cache, which is coupled to provide the full resolution texture data to the texture scaling filter.

18. The 3-D graphics rendering system of claim 13, wherein the tile buffer is sized according to a size of a screen-space tile size on which the tile-based 3-D graphics rendering engine operates.

19. The 3-D graphics rendering system of claim 13, wherein the tile buffer is configured to store data representing the reduced-resolution versions of the texture in format where adjacent textures are grouped into physical blocks in the memory, and each subsequent reduced-resolution version is stored in consecutive locations in the tile buffer.

20. The 3-D graphics rendering system of claim 13, wherein the system is configured to produce a mipmap for each portion of full-resolution texture required to texture a particular screen-space tile being rendered, on a tile-by-tile basis.

21. The 3-D graphics rendering system of claim 13, wherein the system is configured to produce a mipmap for each full-resolution texture required to texture all of the tiles of an image being rendered, prior to commencement of texturing.

* * * * *